United States Patent
Berg et al.

(12)

(10) Patent No.: US 6,643,761 B1
(45) Date of Patent: Nov. 4, 2003

(54) ADDRESS GENERATION UNIT AND DIGITAL SIGNAL PROCESSOR (DSP) INCLUDING A DIGITAL ADDRESSING UNIT FOR PERFORMING SELECTED ADDRESSING OPERATIONS

(75) Inventors: Vincent Berg, Dublin (IE); Christopher Bleakley, Dublin (IE); Brian Murray, Dublin (IE); Jose Rodriguez, Dublin (IE)

(73) Assignee: Massana Research Limited, Dublin (IE)

(*) Notice: Subject to any disclaimer, the term of this patent is extended or adjusted under 35 U.S.C. 154(b) by 242 days.

(21) Appl. No.: 09/658,022

(22) Filed: Sep. 8, 2000

(30) Foreign Application Priority Data

Sep. 8, 1999 (IE) .................................... 990758

(51) Int. Cl.[7] ............................................. G06F 12/00
(52) U.S. Cl. ........................ 711/220; 711/219; 711/211
(58) Field of Search ................................ 711/220, 219, 711/211; 708/404, 670, 673, 708, 709

(56) References Cited

U.S. PATENT DOCUMENTS

| | | | | |
|---|---|---|---|---|
| 5,285,406 A | * | 2/1994 | Lynch et al. ................. | 708/714 |
| 5,450,553 A | | 9/1995 | Kitagaki et al. ............. | 711/214 |
| 5,649,146 A | * | 7/1997 | Riou ........................... | 711/217 |
| 6,035,313 A | * | 3/2000 | Marchant ..................... | 708/404 |
| 6,115,728 A | * | 9/2000 | Nakai et al. ................. | 708/404 |
| 6,314,507 B1 | * | 11/2001 | Doyle .......................... | 711/220 |

FOREIGN PATENT DOCUMENTS

| | | |
|---|---|---|
| EP | 0303009 A2 | 2/1989 |
| WO | WO92/00563 | 1/1992 |

OTHER PUBLICATIONS

Wess et al, "Minimization of Data Address Computation Overhead in DSP Programs," Proceedings of the 1998 IEEE Intl. Conf. on Acoustics, Speech and Signal Processing, vol. 5, 1998, pp. 3093–3096.*

Bleakley et al, "FILU–200 DSP Coprocessor IP Core," Conference Record of the Thirty Third Asilomar Conference on Signals, Systems and Computers, vol. 1, 1999, pp. 757–761.*

* cited by examiner

*Primary Examiner*—Glenn Gossage
(74) *Attorney, Agent, or Firm*—Jacobson Holman PLLC

(57) ABSTRACT

An address generation unit (AGU) and a digital signal processor (DSP) including such an AGU are disclosed. The AGU (3) has a register file (4) providing order (R), stage (S), and displacement (N) values to a digital addressing unit (DAU) (5) for performing one of eight addressing operations. The register file provides an input (X) to the DAU and receives an output (Y) from the DAU. Within the DAU (5), selection multiplexers (13, 14) select full adder outputs to provide Y, or bit-select from adders and the input (X) to provide Y. For a radix-4 operation, most significant bits (MSBs) are taken from the input (X), middle bits are taken from the output of a first adder (adder1), and the least significant bits (LSBs) are taken from the output of a second adder (adder2) if there is a carry out from the first adder. The AGU may also include bit reverse blocks connected at both the input and output of an adder. The DSP includes a program control unit for delivering a control signal to the AGU for selection of a required addressing operation.

12 Claims, 3 Drawing Sheets

ADDRESS GENERATION UNIT AND DIGITAL SIGNAL PROCESSOR (DSP) INCLUDING A DIGITAL ADDRESSING UNIT FOR PERFORMING SELECTED ADDRESSING OPERATIONS

FIELD OF THE INVENTION

The invention relates to an address generation unit (AGU) and to a logic circuit incorporating an AGU.

PRIOR ART DISCUSSION

Many different configurations of an AGU have been provided heretofore. However, they suffer from limited versatility in the range of possible addressing operations.

It is therefore an object of the invention to provide an AGU having a greater range of possible addressing operations, while also having a relatively small silicon area. Another object is to provide an AGU having a higher clock frequency and data throughput than conventional AGUs.

SUMMARY OF THE INVENTION

According to the invention, there is provided an address generation unit for a digital signal processor, the address generation unit comprising a digital addressing unit comprising:
  a plurality of adders;
  an input path connected to the adders;
  selection multiplexers connected to the adder outputs; and
  a control logic for controlling the adders and the multiplexers to operate with a configuration for each of a plurality of addressing operations.

In one embodiment, the address generation unit further comprises a register file for providing parameter values for the digital addressing unit.

In another embodiment, the register file delivers order, stage, and displacement values to the digital addressing unit.

In a further embodiment, the register file provides an input to the digital addressing unit and receives an output from the digital addressing unit.

In one embodiment, a selection multiplexer is connected to a plurality of the adders and directly to the input path, and the selection multiplexer selects bits from its inputs to provide a combined output.

In one embodiment, the control logic selects bits from a second adder if there is a carry out from a first adder.

In one embodiment, the control logic delivers a mask signal to the first adder to ensure that the carry is propagated to carry out.

In another embodiment, the control logic directs signals to the adders and to the multiplexers for radix-4 increment and radix-4 decrement addressing operations.

In a further embodiment, the control logic directs a radix-4 addressing operation as follows:
  directing the second adder to pre-compute +1 for radix-4 increment or to pre-compute −1 for radix-4 decrement;
  delivering a control signal to the first adder according to order and stage parameter values;
  delivering a masking signal to the first adder to mask most significant bits (MSBs) to ensure that a carry is propagated to carry out;
  controlling a selection multiplexer to provide an output comprising:
    MSBs from the input signal;
    middle bits from the output of the first adder; and
    least significant bits (LSBs) from the output of the second adder if there is a carry out from the first adder, or alternatively from the input signal.

In one embodiment, an adder is connected at both its input and its output to a bit reverse block, and the bit-reverse block connected to the adder input is connected to the input path.

In one embodiment, the control logic delivers a second input to the adder according to the order value.

According to another aspect, the invention provides a digital signal processor comprising an address generation unit as defined above and a program control unit for delivering a control signal to the address generation unit for selection of the required addressing operation.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which.

DESCRIPTION OF THE INVENTION

Figure 1:
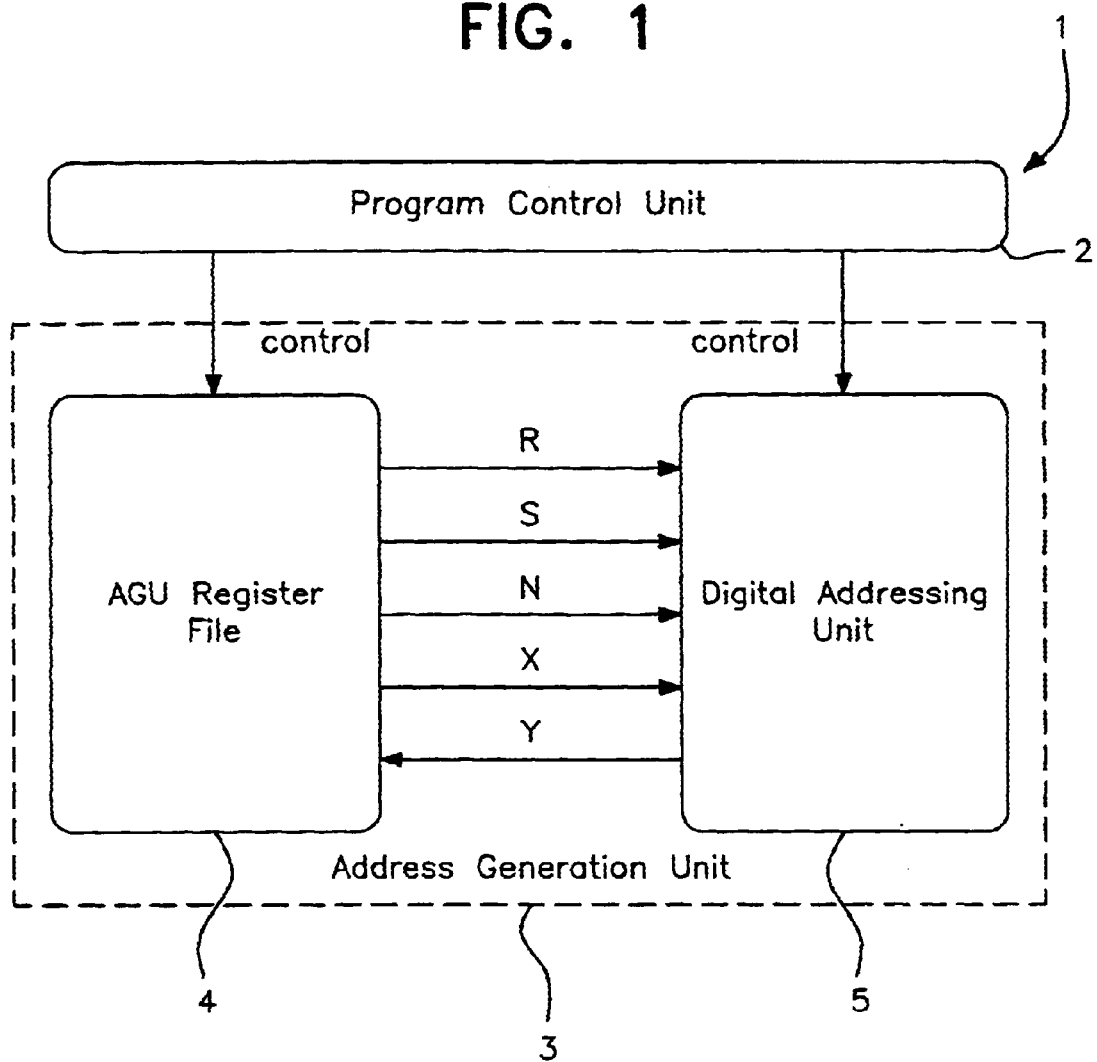
FIG. 1 is a schematic representation of a DSP of the invention.

Referring to FIG. 1 a digital signal processor (DSP) 1 comprises a program control unit (PCU) 2 providing control signals for an address generation unit (AGU) 3. The AGU 3 comprises a Register File 4 and a digital addressing unit (DAU) 5. The Register File generates order (R), stage (S), and displacement (N) parameter values under control of the PCU 2. The Register File 4 also generates the X input for the DAU 5 and it receives the Y output from the DAU 5.

Figure 2:
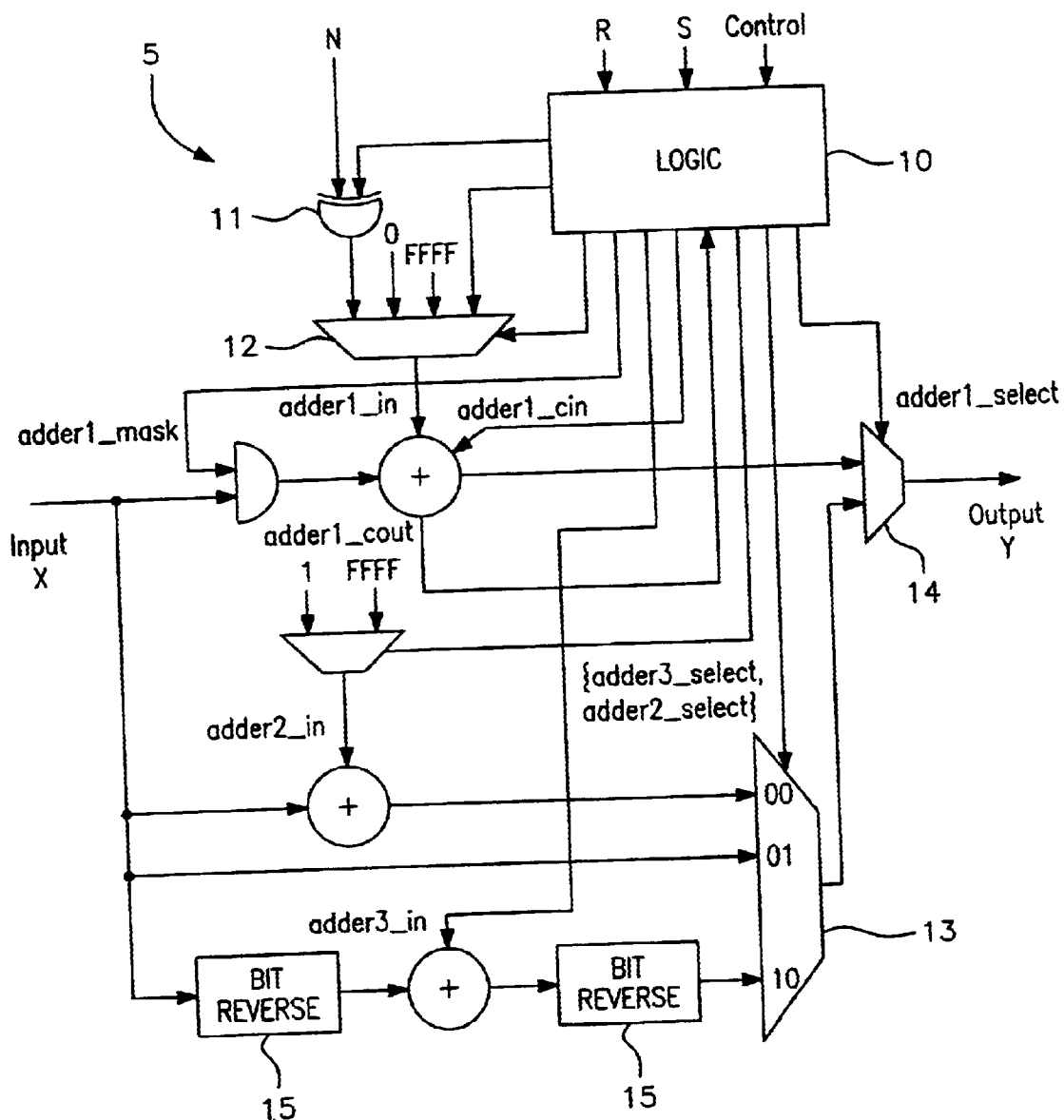
FIG. 2 is a detailed diagram illustrating a digital addressing unit (DAU) of the DSP.

Referring to FIG. 2 the DAU 5 is illustrated in detail. The thin lines represent 1 bit control signal paths, whereas the thick lines represent 16-bit address paths. The DAU 5 comprises a logic circuit 10 which receives the R and S values from the Register File 4 and a Control input from the PCU 2 to determine the addressing operation to be performed. A logic gate 11 receives the N value from the Register File and an input from the logic circuit 10 and it provides an input to an input multiplexer 12. The DAU 5 also comprises a first selection multiplexer 13 and a second selection multiplexer 14. There are three adders, namely adder1, adder2, and adder3. The adder3 has a bit reverse block 15 on either side. The logic circuit 10 is connected to provide either control or address inputs to the adders and multiplexers. These paths allow the logic circuit 10 to set the internal control signals to perform the required operation.

Adder1 performs linear and displacement increment and decrement operations. It also calculates the middle term of the output during radix-4 operations. Adder2 performs linear increment and decrement operations and is also used to pre-calculate the LSB term of the output during radix-4 operations. The adder3 performs bit-reversed operations. The multiplexers 13 and 14 are used to select the appropriate adder outputs to form the correct address output Y.

The following table sets out the different addressing operations which are performed by the DAU 5 together with the circuit configurations. In this table, where the control signal is not listed it is "don't care", "~" means "bit-wise negate", and "^" means "to the power of".

| Operation | Logic Block Output |
|---|---|
| Linear increment | adder1_in = 0<br>adder1_select = 0<br>adder1_cin = 1<br>adder1_mask = 2^B − 1 |
| Linear decrement | adder1_in = 2^B − 1<br>adder1_select = 0<br>adder1_cin = 0<br>adder1_mask = 2^B − 1 |
| Displacement increment | adder1_in = N<br>adder1_select = 0<br>adder1_cin = 0<br>adder1_mask = 2^B − 1 |
| Displacement decrement | adder1_in = ~N<br>adder1_select = 0<br>adder1_cin = 1<br>adder1_mask = 2^B − 1 |
| Bit reversed increment | adder1_select = 2^B − 1<br>adder2_select = 0<br>adder3_in = 2^(B − R)<br>adder3_select = 2^B − 1 |
| Bit reversed decrement | adder1_select = 2^B − 1<br>adder2_select = 0<br>adder3_in = 2^B − 2^(B − R)<br>adder3_select = 2^B − 1 |
| Radix-4 increment | adder1_in = 2^B − 2^R +<br>2^(2*max(S − 1,0) + R mod 2)<br>adder1_Select = 2^B − 2^R +<br>adder1_cout⁻ (2^(2*max(S − 1,0) + R mod 2) − 1)<br>adder1_cin = 0<br>adder1_mask = ~(2^B − 2^R)<br>adder2_in = 1<br>adder2_select 2^B − 2^R<br>adder3_select = 0 |
| Radix-4 decrement | adder1_in = 2^B −<br>2^(2*max(S − 1,0) + R mod 2)<br>adder1_select = 2^B − 2^R + (−adder1_cout) *<br>(2^(2*max(S − 1,0) + R mod 2) − 1)<br>adder1_cin = 0<br>adder1_mask = ~(2^B − 2^R)<br>adder2_in = 2^B − 1<br>adder2_select = 2^B − 2^R<br>adder3_select = 0 |

The addressing operations are based on the following specifications.

Linear increment/decrement:

$$y=(x\pm 1)\bmod 2^B \qquad (1)$$

Displacement increment/decrement:

$$y=(x\pm N)\bmod 2^K \qquad (2)$$

Bit reversed increment/decrement:

$$y=(x\operatorname{div}2^K)2^R+\operatorname{rev}((\operatorname{rev}(x\bmod 2^R)\pm 1)\bmod 2^K) \qquad (3)$$

Figure 3:
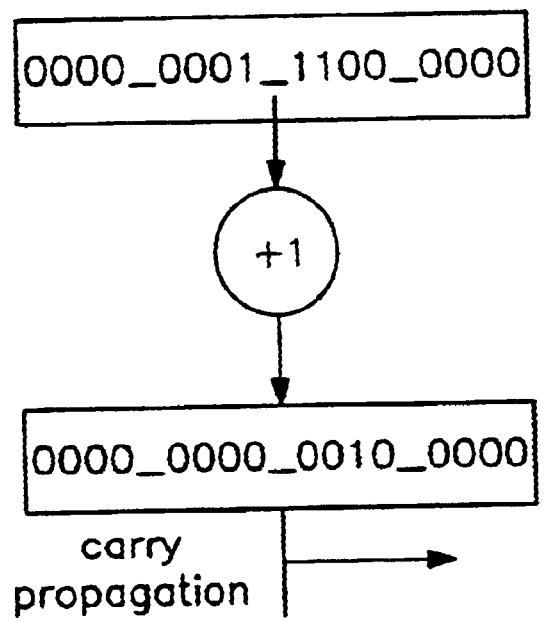
FIGS. 3 and 4 are diagrams illustrating how an addressing operation is performed.

The position at which the +1 input is inserted is determined by the order of the Fast Fourier Transform (FFT), R. The carry is propagated from left to right. This is the opposite of conventional arithmetic. A bit reversed increment is shown in FIG. 3.

Radix-4 increment:

$$c=R\bmod 2+2(S-1) \qquad (4)$$

$$t_1=((x\bmod 2^R)\operatorname{div}2^c)2^c+2^c$$

$$t_2=(x+t_1\operatorname{div}2^R)\bmod 2^c$$

$$t_3=(x\operatorname{div}2^R)2^R$$

$$y=t_3+(t_2+t_1)\bmod 2^R$$

Figure 4:
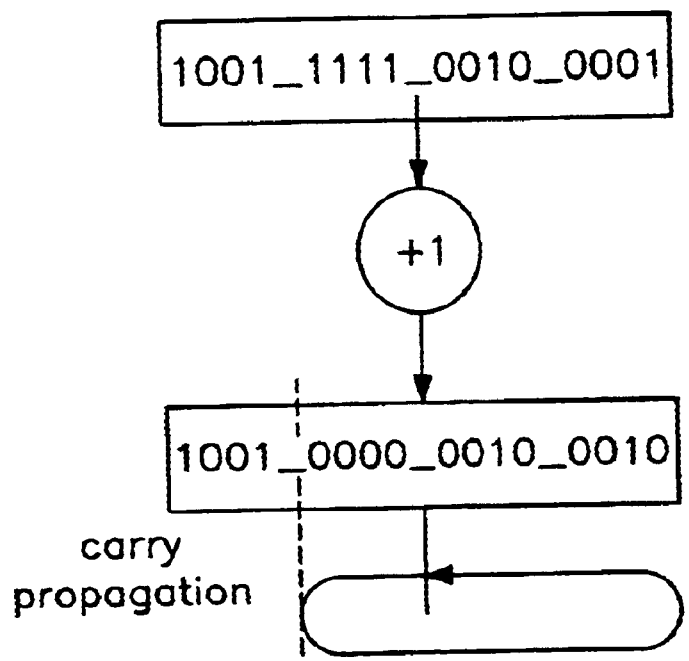

The +1 input is injected as a bit number determined by the order, R, and the stage, S. The carry is propagated from right to left. When a certain bit position determined by the order, R, is reached, the carry is circularly propagated to bit 0. The carry stops propagating at the bit one position less significant than the one at which +1 was injected. This is shown in FIG. 4.

Radix-4 decrement:

$$t_1=((x\bmod 2^R)\operatorname{div}2^c)2^c+2^R-2^c \qquad (5)$$

$$t_2=(x+t_1\operatorname{div}2^R+2^c-1)\bmod 2^c$$

$$t_3=(x\operatorname{div}2^R)2^R$$

$$y=t_3+(t_2+t_1)\bmod 2^R$$

where:

x=address input (unsigned binary)

y=address output (unsigned binary)

B=number of bits

N=address displacement (unsigned binary)

R=order of the FFT

S=stage in the FFT c=the bit weight at which the radix-4 increment or decrement is to be injected t=the middle term of the radix-4 output a mod b=the remainder after a is divided by b:

$$a\bmod b = \begin{cases} a-b\operatorname{floor}(a/b) & b\neq 0 \\ a & b=0 \end{cases} \qquad (6)$$

floor (a)=a rounded to the nearest integer towards minus infinity a div b=the quotient after a is divided by b:

$$a\operatorname{div}b=\operatorname{floor}(a/b) \qquad (7)$$

rev(a)=the bit reversal of a:

$$rev(a) = \sum_{i=0}^{R-1} 2B-1-t((a\operatorname{div}2^i)\bmod 2) \qquad (8)$$

To illustrate operation of the DAU 5, the following is an example of the hardware configuration for a sample input X and an output Y for each of the eight addressing operations B is 16.

| Operation | Input X | Output Y | Configuration |
|---|---|---|---|
| Linear Increment<br>Y = X + 1 | 0000_0000_0000_0000<br>0000_0000_0000_0001 | 0000_0000_0000_0001<br>0000_0000_0000_0010 | Y equals the output of adder 1<br>adder1_mask is all high (no bits masked)<br>adder1_in is zero<br>adder1_cin is one |
| Linear decrement<br>Y = X − 1 | 0000_0000_0000_0001<br>0000_0000_0000_0010 | 0000_0000_0000_0000<br>0000_0000_0000_0001 | Y equals the output of adder 1<br>adder1_mask is all high (no bits masked)<br>adder1_in is all high (equivalent to minus 1)<br>adder1_cin is zero |
| Displacement<br>increment<br>Y = X + N<br>e.g. N = 3 | 0000_0000_0000_0000<br>0000_0000_0000_0001 | 0000_0000_0000_0011<br>0000_0000_0000_0100 | Y equals the output of adder 1<br>adder1_mask is all high (no bits masked)<br>adder1_in equals N<br>adder1_cin is zero |
| Displacement<br>decrement<br>Y = X − N<br>e.g. N = 3 | 0000_0000_0000_0011<br>0000_0000_0000_0100 | 0000_0000_0000_0000<br>0000_0000_0000_0001 | Y equals the output of adder 1<br>adder1_masked is all high (no bits masked)<br>adder1_in equals N inverted<br>adder1_cin is one |
| Bit reversed<br>increment<br>Y = BR(BR(X) + 1)<br>e.g. R = 4 | 0000_0100_0001_0000<br>0000_0100_0001_1000<br>0000_0100_0001_0100<br>0000_0100_0001_1100 | 0000_0100_0001_1000<br>0000_0100_0001_0100<br>0000_0100_0001_1100<br>0000_0100_0001_0010 | Y equals the output of adder_3 (bit reversed)<br>adder3_in equals 0000_0001_0000_0000 for<br>R = 4 |
| Bit reversed<br>decrement<br>Y = BR(BR(X) − 1)<br>e.g. R = 4 | 0000_0100_0001_1000<br>0000_0100_0001_0100<br>0000_0100_0001_1100<br>0000_0100_0001_0010 | 0000_0100_0001_0000<br>0000_0100_0001_1000<br>0000_0100_0001_0100<br>0000_0100_0001_1100 | Y equals the output of adder_3 (bit reversed)<br>adder3_in equals 1111_0000_0000_0000 for<br>R = 4 |
| Radix-4 increment<br>Y = RX(X + 1)<br>e.g. R =4, S = 2 | 0000_0100_0001_0000<br>0000_0100_0001_0100<br>0000_0100_0001_1000<br>0000_0100_0001_1100<br>0000_0100_0001_0001<br>0000_0100_0001_0101 | 0000_0100_0001_0100<br>0000_0100_0001_1000<br>0000_0100_0001_1100<br>0000_0100_0001_0001<br>0000_0100_0001_0101<br>0000_0100_0001_1001 | Y equals a bit select from the adder_1 output,<br>the adder_2 output and the input X. The MSBs<br>are taken from the input X. The middle bits are<br>taken from the output of adder_1. If there is a<br>carry out from adder_1, the LSBs are taken<br>from the output of adder_2. If there is no carry<br>out from adder_1, the LSBs are taken from the input X.<br>adder2_in is one (pre-computes + 1)<br>adder1_in is determined by R and S<br>adder1_mask masks MSBs to ensure carry is<br>propagated to carry out |
| Radix-4 decrement<br>Y = RX(X − 1)<br>e g R = 4, S = 2 | 0000_0100_0001_0100<br>0000_0100_0001_1000<br>0000_0100_0001_1100<br>0000_0100_0001_0001<br>0000_0100_0001_0101<br>0000_0100_0001_1001 | 0000_0100_0001_0000<br>0000_0100_0001_0100<br>0000_0100_0001_1000<br>0000_0100_0001_1100<br>0000_0100_0001_0001<br>0000_0100_0001_0101 | Y equals a bit select from adder_1 output,<br>adder_2 output and the input X. The MSBs are<br>taken from the input X. The middle bits are<br>taken from the output of adder_1. If there is a<br>carry out from adder_1, the LSBs are taken<br>from the output of adder_2. If there is no carry<br>out from adder_1, the LSBs are taken from the input X.<br>adder2_in is all high (pre-computes − 1)<br>adder1_in is determined by R and S<br>adder1_mask masks MSBs to ensure carry is<br>propagated to carry out |

It will be appreciated that the DSP 1 provides a short critical path because of multiplexing both for choice of output Y and for combining adder outputs and parts of the input X to generate the output Y. This enables a relatively high clock frequency and data throughput. Also, the DSP 1 supports separate stage counters for data read and write. This facilitates zero overhead looping within a FFT function. Another advantage is that the silicon area is small because there is direct calculation of addresses rather than translation. Another benefit is that eight different addressing operations are supported.

The invention is not limited to the embodiments described but may be varied in construction and detail.

What is claimed is:

1. An address generation unit for a digital signal processor, the address generation unit including a digital addressing unit for performing a plurality of addressing operations, and said digital addressing unit comprising:

a plurality of adders, each having an output;

an input path being connected to at least one of said plurality of adders to provide a sample input signal (X) to the at least one of said plurality of adders;

a plurality of selection multiplexers connected to the outputs of the plurality of adders; and control logic for controlling the plurality of adders and the plurality of selection multiplexers to perform a selected addressing operation with said plurality of adders and said plurality of multiplexers from said plurality of addressing operations.

2. The address generation unit as claimed in claim 1, wherein the address generation unit further comprises a register file providing parameter values to the digital addressing unit.

3. The address generation unit as claimed in claim 2, wherein the register file delivers order (R), stage (S), and displacement (N) values to the digital addressing unit.

4. An address generation unit as claimed in claim 2, wherein the register file provides said input signal (X) to the digital addressing unit on the input path and receives an output signal (Y) from the digital addressing unit.

5. The address generation unit as claimed in claim 1, wherein one of said selection multiplexers is connected at its input to the outputs of said plurality of adders and is connected directly to the input path to receive said sample input signal (X), and one of said selection multiplexer selects bits from its inputs to provide a combined output.

6. The address generation unit as claimed in claim 5, wherein the control logic selects bits from a second one of the plurality adders if there is a carry out from a first one of the plurality adders, based on the operation and the configuration for at least one of said plurality of addressing operations.

7. The address generation unit as claimed in claim 6, wherein the control logic delivers a mask signal to the first adder to ensure that the carry is propagated to carry out.

8. The address generation unit as claimed in claim 6, wherein the control logic directs signals to the plurality of adders and to the plurality of multiplexers for radix-4 increment and radix-4 decrement addressing operations.

9. The address generation unit as claimed in claim 8, wherein the control logic directs a radix-4 addressing operation as follows:
   directing the second adder to pre-compute +1 for radix-4 increment or to pre-compute −1 for radix-4 decrement;
   delivering a control signal to the first adder according to order (R) and stage (S) parameter values;
   delivering a masking signal to the first adder to mask most significant bits (MSBs) to ensure that a carry is propagated to carry out;
   controlling said one of the selection multiplexer to provide an output signal (Y) comprising:
   MSBs from the input signal (X);
   middle bits from the output of the first adder; and
   least significant bits (LSBs) from the output of the second adder if there is a carry out from the first adder, or alternatively from the input signal (X).

10. The address generation unit as claimed in claim 1, wherein one of the adders is connected at both its input and its output to a different bit reverse block and the bit-reverse block, at the input of that adder, is connected to the input signal (X).

11. The address generation unit as claimed in claim 10, wherein the control logic (10) delivers a second input to said adder connected to the bit reverse blocks according to the order (R) value.

12. A digital signal processor comprising an address generation unit comprising:
   a plurality of adders, each having an output;
   an input path being connected to provide a sample input signal (X) to the plurality adders;
   selection multiplexers connected to the outputs of the plurality of adders; and
   control logic for controlling the plurality adders and the selection multiplexers to operate with a configuration for each of a plurality of addressing operations;
   and a program control unit for delivering a control signal to the address generation unit for selection of a required addressing operation.

* * * * *